(12) United States Patent
Tomonari et al.

(10) Patent No.: US 7,295,087 B2
(45) Date of Patent: Nov. 13, 2007

(54) SIGNAL TRANSMISSION CIRCUIT (75) Inventors: Toshio Tomonari, Yuri-gun (JP); Toshihiro Kuroshima, Yuri-gun (JP)

(73) Assignee: TDK Corporation, Tokyo (JP)

( * ) Notice: Subject to any disclaimer, the term of this patent is extended or adjusted under 35 U.S.C. 154(b) by 205 days.

(21) Appl. No.: 11/145,967

(22) Filed: Jun. 7, 2005

(65) Prior Publication Data
US 2005/0270117 A1  Dec. 8, 2005

(30) Foreign Application Priority Data
Jun. 8, 2004  (JP) .............................. 2004-169495

(51) Int. Cl.
*H03H 7/00* (2006.01)
(52) U.S. Cl. .................... 333/185; 333/22 R; 333/33
(58) Field of Classification Search ................ 333/185, 333/12, 22 R, 32–35, 263
See application file for complete search history.

(56) References Cited

U.S. PATENT DOCUMENTS

| 3,573,670 | A | | 4/1971 | Skobern |
| 6,160,472 | A | * | 12/2000 | Arashi et al. ................. 338/21 |
| 6,552,606 | B1 | * | 4/2003 | Veltman et al. ............... 330/10 |
| 2003/0058060 | A1 | | 3/2003 | Yamamoto |
| 2005/0040846 | A1 | | 2/2005 | Otsuka et al. |

FOREIGN PATENT DOCUMENTS

| EP | 1 583 305 A2 | 10/2005 |
| JP | A 11-068497 | 3/1999 |
| JP | A 2001-085118 | 3/2001 |
| JP | A 2003-338722 | 11/2003 |
| JP | A 2004-040444 | 2/2004 |
| WO | WO 2004/027967 A1 | 4/2004 |

* cited by examiner

*Primary Examiner*—Robert Pascal
*Assistant Examiner*—Kimberly E Glenn
(74) *Attorney, Agent, or Firm*—Oliff & Berridge, PLC (57) ABSTRACT

A signal transmission circuit having a characteristic impedance includes a common mode filter, a first capacitive element, a first connection line, a second capacitive element and a second connection line. The first capacitive element has a first terminal. The first connection line connects one output of the common mode filter to the first capacitive element. The second connection line connects the other output of the common mode filter to the second capacitive element. The first connection line has a first length. The second connection line has a second length. Each of the first length and the second length is within a predetermined range to change the characteristic impedance.

5 Claims, 12 Drawing Sheets

SIGNAL TRANSMISSION CIRCUIT

BACKGROUND OF THE INVENTION

1. Field of the Invention

The present invention relates to a signal transmission circuit, and particularly to a signal transmission circuit including a common mode filter and a capacitive element.

2. Description of Related Art

Conventionally, a differential transmission method has been used for transferring digital signals between electronic devices. Differential transmission is a method of inputting a digital signal into a pair of signal line paths in reverse phase so that radiation noise produced from the signal lines and external noise can be cancelled. Since external noise is cancelled, total noise is also reduced. Since signals are not affect by noise, signals can be transmitted at smaller amplitude. Therefore, the rise and fall time of the signal is shortened, enabling high-speed signal transmission.

Types of cable capable of performing the differential transmission method include USB, DVI, and the more recent HDMI type capable of transmitting more digital signals. HDMI cable uses a high-speed serial interface for connecting a digital transmitter, such as a DVD player or a set top box, to a digital television or the like for transmitting uncompressed digital signals. One HDMI cable is capable of transferring both of video signals and voice signals at a high speed.

When increasing the signal transmission speed, noise can be generated by a slight offset in the differential signal between signal lines. One transmission circuit proposed in Japanese patent application publication No. 2001-85118 reduces noise by inserting a common mode choke coil in a cable or other interface.

However, the impedance on the transmission path must be matched when high-frequency or high-speed pulse signals are transmitted. If the impedance is not matched, the high-frequency component of the signal is reflected by the unmatched part of the impedance, resulting in a large return loss that greatly attenuates the signal. Further, unnecessary radiation noise is produced by the reflection.

Figure 1:
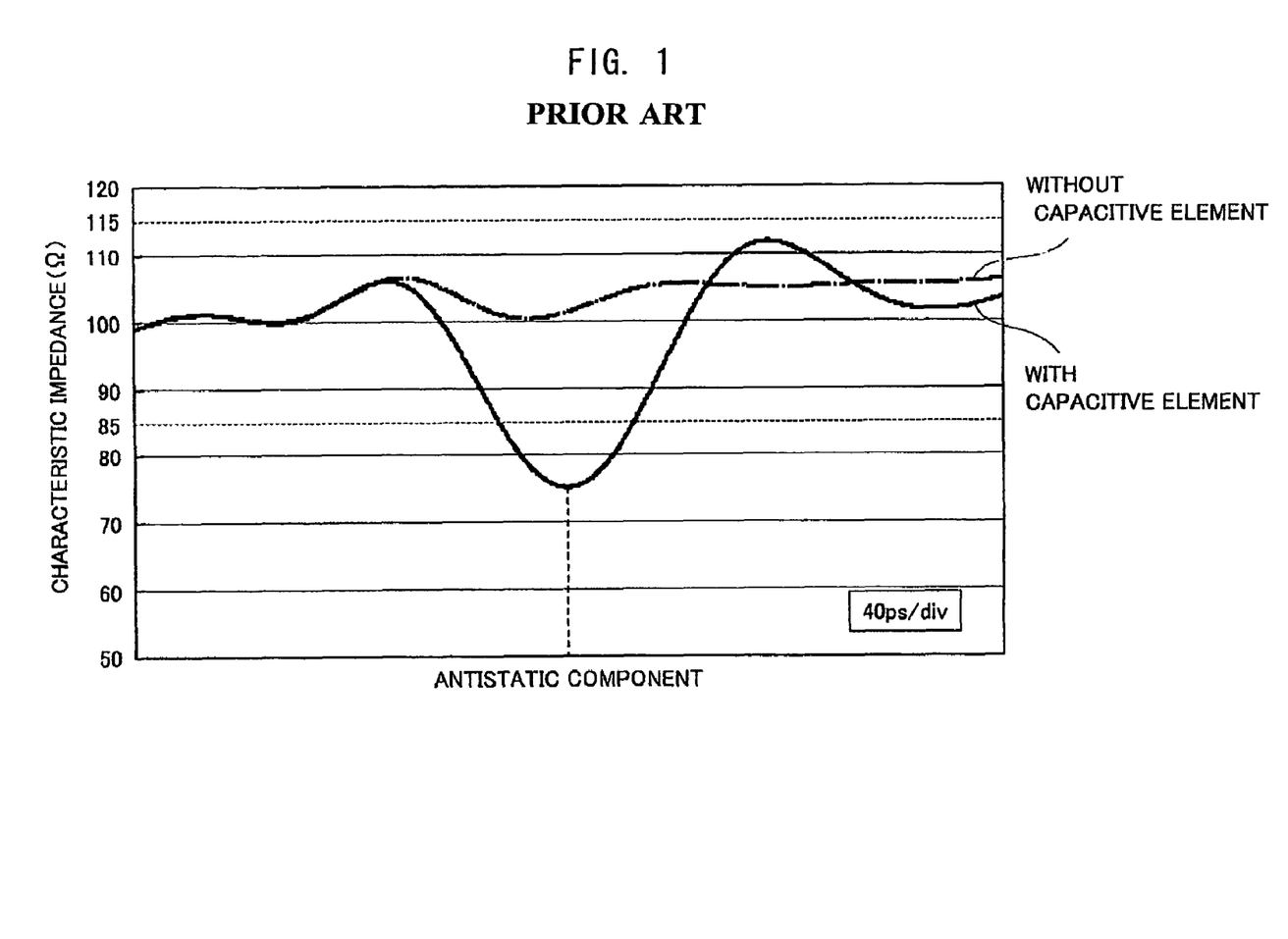
FIG. 1 is a graph showing characteristic impedance at various positions in a transmission circuit.

A capacitive element such as a varistor, capacitor, or zener diode is normally inserted into the connection part of the digital television with the interface as an antistatic component. The graph in FIG. 1 shows characteristic impedance for positions on the transmission path when a capacitive element (1.1 pF) is inserted on the transmission path and when a capacitive element is not inserted on the transmission path. Normally, as capacitance component increases, impedance reduces. It would be seen that the capacitance component reduces the characteristic impedance at the location of the antistatic component in FIG. 1. As a result, the high-frequency component of the signal is reflected at the position of the antistatic component, generating noise.

SUMMARY OF THE INVENTION

In view of the above-described drawbacks, it is an objective of the present invention to provide a signal transmission circuit capable of moderating the drop in characteristic impedance caused by an antistatic capacitive element.

In order to attain the above and other objects, the present invention provides a signal transmission circuit having a characteristic impedance and including a common mode filter, a first capacitive element, a first connection line, a second capacitive element and a second connection line. The common mode filter includes a core, and first and second signal lines wound in a spiral around the core. The first signal line has a first input and a first output. The second signal line has a second input and a second output. Signals in reverse phase are input to the first input and the second input. The first capacitive element has a first terminal. The first connection line has a first end and a second end. The first connection line is connected to the first output only at the first end. The first connection line is connected to the first terminal only at the second end. The first connection line has a first length. The second capacitive element has a second terminal. The second connection line has a primary end and a secondary end. The second connection line is connected to the second output only at the primary end. The second connection line is connected to the second terminal only at the secondary end. The second connection line has a second length. Each of the first length and the second length is within a predetermined range to change the characteristic impedance.

It is preferable that each of the first length and the second length is within 3 mm.

It is preferable that each of the first connector and the first connector is a pattern formed on a printed circuit board.

It is preferable that each of the first capacitive element and the second capacitive element is a varistor.

Another aspect of the present invention provides an electronic device having a signal transmission circuit. The signal transmission circuit has a characteristic impedance and includes a common mode filter, a first capacitive element, a first connection line, a second capacitive element and a second connection line. The common mode filter includes a core, and first and second signal lines wound in a spiral around the core. The first signal line has a first input and a first output. The second signal line has a second input and a second output. Signals in reverse phase are input to the first input and the second input. The first capacitive element has a first terminal. The first connection line has a first end and a second end. The first connection line is connected to the first output only at the first end. The first connection line is connected to the first terminal only at the second end. The first connection line has a first length. The second capacitive element has a second terminal. The second connection line has a primary end and a secondary end. The second connection line is connected to the second output only at the primary end. The second connection line is connected to the second terminal only at the secondary end. The second connection line has a second length. Each of the first length and the second length is within a predetermined range to change the characteristic impedance.

It is preferable that each of the first length and the second length is within 3 mm.

Another aspect of the present invention provides a cable having a signal transmission circuit. The signal transmission circuit has a characteristic impedance and includes a common mode filter, a first capacitive element, a first connection line, a second capacitive element and a second connection line. The common mode filter includes a core, and first and second signal lines wound in a spiral around the core. The first signal line has a first input and a first output. The second signal line has a second input and a second output. Signals in reverse phase are input to the first input and the second input. The first capacitive element has a first terminal. The first connection line has a first end and a second end. The first connection line is connected to the first output only at the first end. The first connection line is connected to the first terminal only at the second end. The first connection line has a first length. The second capacitive element has a second terminal. The second connection line has a primary end and a secondary end. The second connection line is connected to the second output only at the primary end. The second connection line is connected to the second terminal only at the secondary end. The second connection line has a second length. Each of the first length and the second length is within a predetermined range to change the characteristic impedance.

It is preferable that each of the first length and the second length is within 3 mm.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

A signal transmission circuit according to preferred embodiments of the present invention will be described while referring to the accompanying drawings wherein like parts and components are designated by the same reference numerals to avoid duplicating description.

A signal transmission circuit according to a first embodiment of the present invention will be described with reference to FIGS. 2 through 10.

Figure 2:
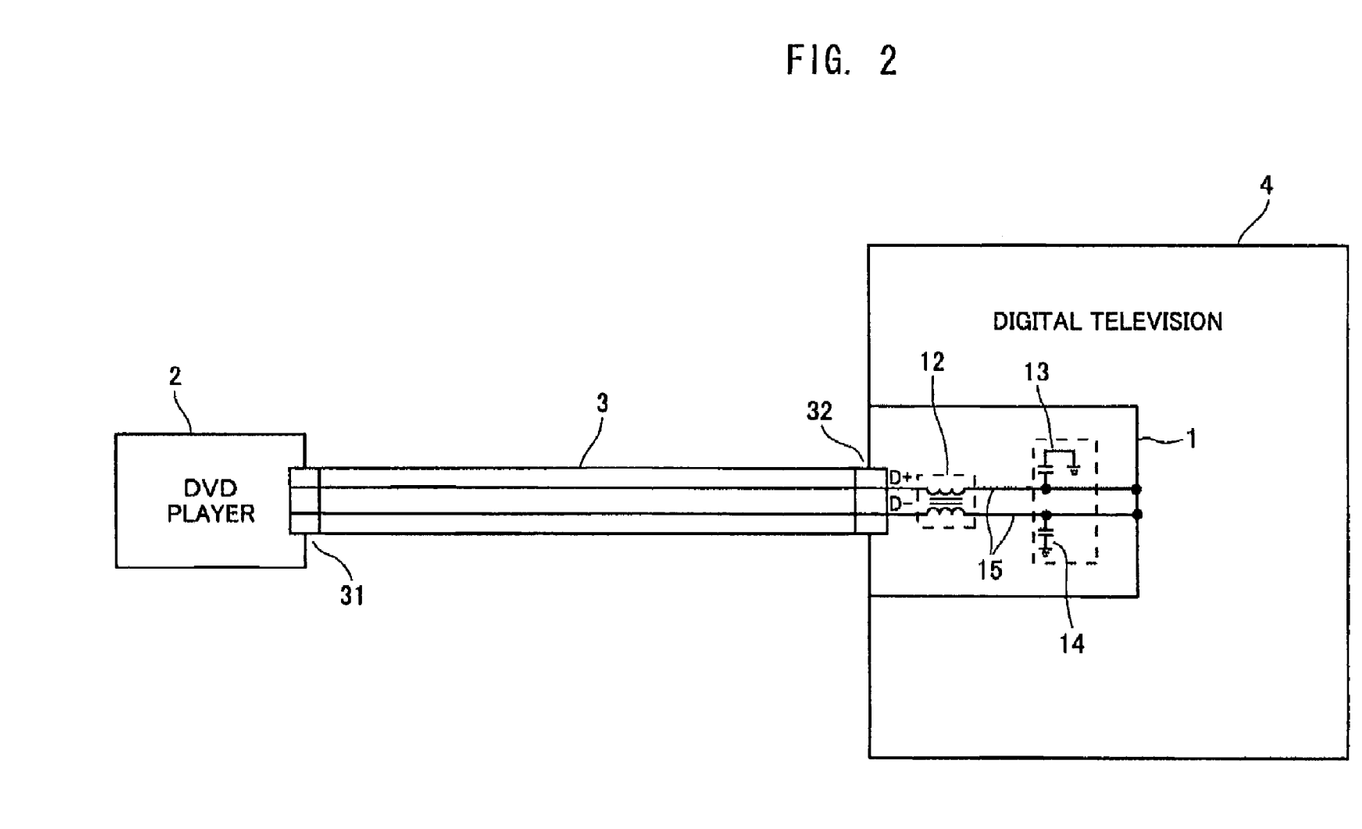
FIG. 2 is an explanatory diagram showing a signal transmission circuit according to a first embodiment.

FIG. 2 shows a digital television 4 connected to a DVD player 2 with an HDMI cable 3. A signal transmission circuit 1 according to the present embodiment is provided on an input part of the digital television 4. The HDMI cable 3 is a differential transmission type cable that includes connectors 31 and 32. The connector 32 is connected to the signal transmission circuit 1, while the connector 31 is connected to the DVD player 2. Digital signals are transmitted from the DVD player 2 to the digital television 4 at a high rate of speed via the HDMI cable 3 and the signal transmission circuit 1.

The signal transmission circuit 1 is a differential transmission circuit mounted on a printed circuit board and includes signal lines D+ and D−, a common mode filter 12, varistors 13 and 14, and connectors 15. Each of one end of the signal line D+ and one end of the signal line D− is connected to the connector 32 of the HDMI cable 3, while each of the other ends is connected to the input of the common mode filter 12. The output of the common mode filter 12 is connected to the digital television 4 via the conductive connectors 15.

Further, each of one terminal of the varistor 13 and one terminal of the varistor 14 provided as antistatic measures is connected to the output of the common mode filter 12. Each of the other terminal of the varistor 13 and the other terminal of varistor 14 is grounded. In the preferred embodiment, the filter used as the common mode filter 12 is an ACM series filter manufactured by TDK Corporation having low decay in the high-frequency component. AVR series varistors also manufactured by TDK Corporation are used as the varistors 13 and 14.

Figure 3A:
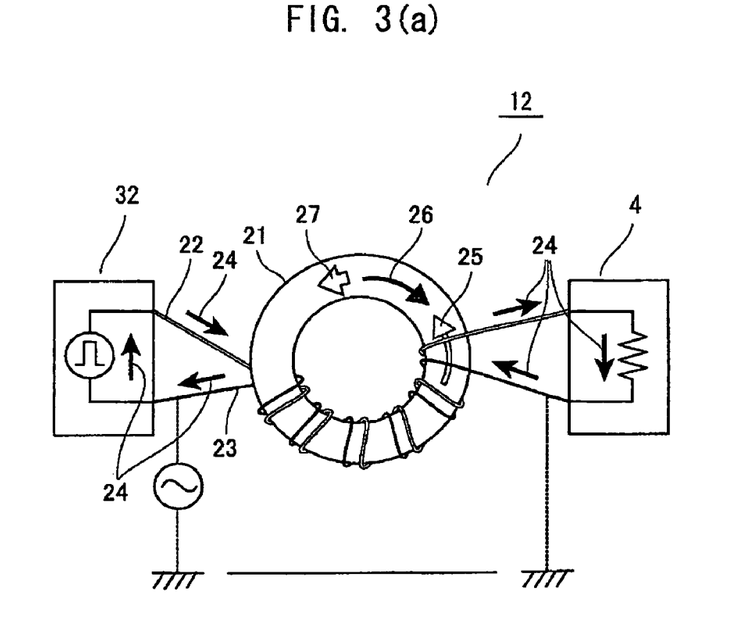
FIG. 3(a) is an explanatory diagram illustrating operations of a common mode filter in a differential mode.
Figure 3B:
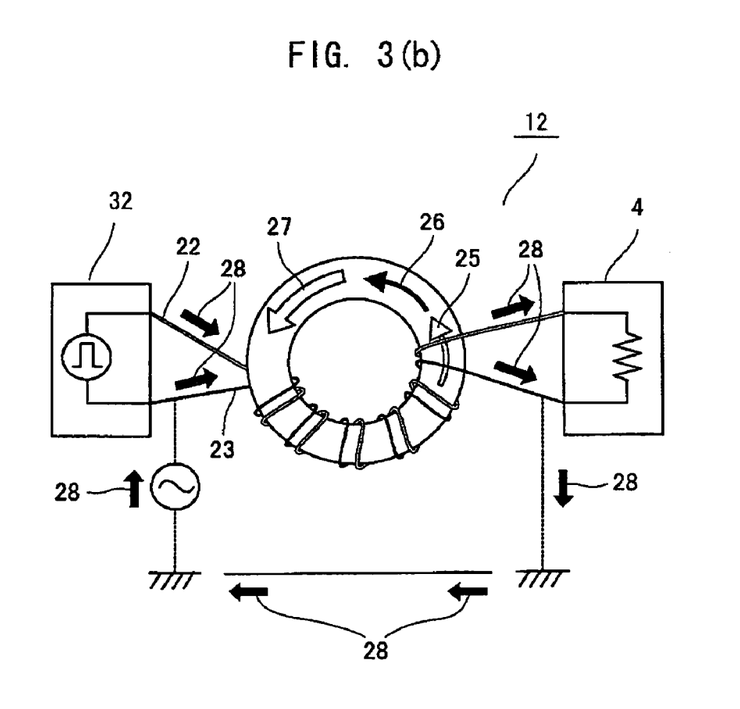
FIG. 3(b) is an explanatory diagram illustrating operations of the common mode filter in a common mode.

Next, the structure and operations of the common mode filter 12 will be described with reference to FIGS. 3(a) and 3(b). The common mode filter 12 includes an annular ferrite core 21 and two signal lines 22 and 23 that are insulated from each other but bound tightly together and wound a plurality of times around the ferrite core 21. The input ends of the signal lines 22 and 23 are connected to the connector 32 of the HDMI cable 3, while the output ends are connected to the digital television 4.

In the preferred embodiment, the common mode filter 12 is used in a differential mode for signals. FIG. 3(a) illustrates operations of the common mode filter 12 in the differential mode. In this mode, a signal 24 is inputted into the signal lines 22 and 23 in reverse phase. Hence, magnetic fluxes 25 and 26 generated by the signal lines 22 and 23 in the ferrite core 21 run in opposite directions and therefore cancel each other. As a result, a magnetic field 27 produced by the signal lines 22 and 23 generates almost no impedance (inductance), allowing the signal 24 to be outputted with little decay.

On the other hand, the common mode filter 12 is used in a common mode for a common mode noise 28. FIG. 3(b) illustrates the operations of the common mode filter 12 in the common mode. In this mode, the common mode noise 28 is generated in the same direction in the signal lines 22 and 23. Hence, the magnetic fluxes 25 and 26 produced by the signal lines 22 and 23 in the ferrite core 21 run in the same direction and therefore increase in intensity. As a result, the magnetic field 27 produced by the signal lines 22 and 23 generates high impedance so that almost none of the common mode noise 28 is outputted.

In this way, the common mode filter 12 can function to attenuate only noise without decaying signals. Therefore, signals output from the DVD player 2 are transmitted to the digital television 4 without change.

While external noise can be reduced by the common mode filter 12, it is also necessary to reduce noise produced by signals reflected at discontinuous points in the characteristic impedance on the transmission path. Therefore, the TDR method that measures the characteristic impedance on each point of a transmission path by measuring pulses reflected at discontinuous points in the characteristic impedance on the transmission path, is used.

Figure 4:
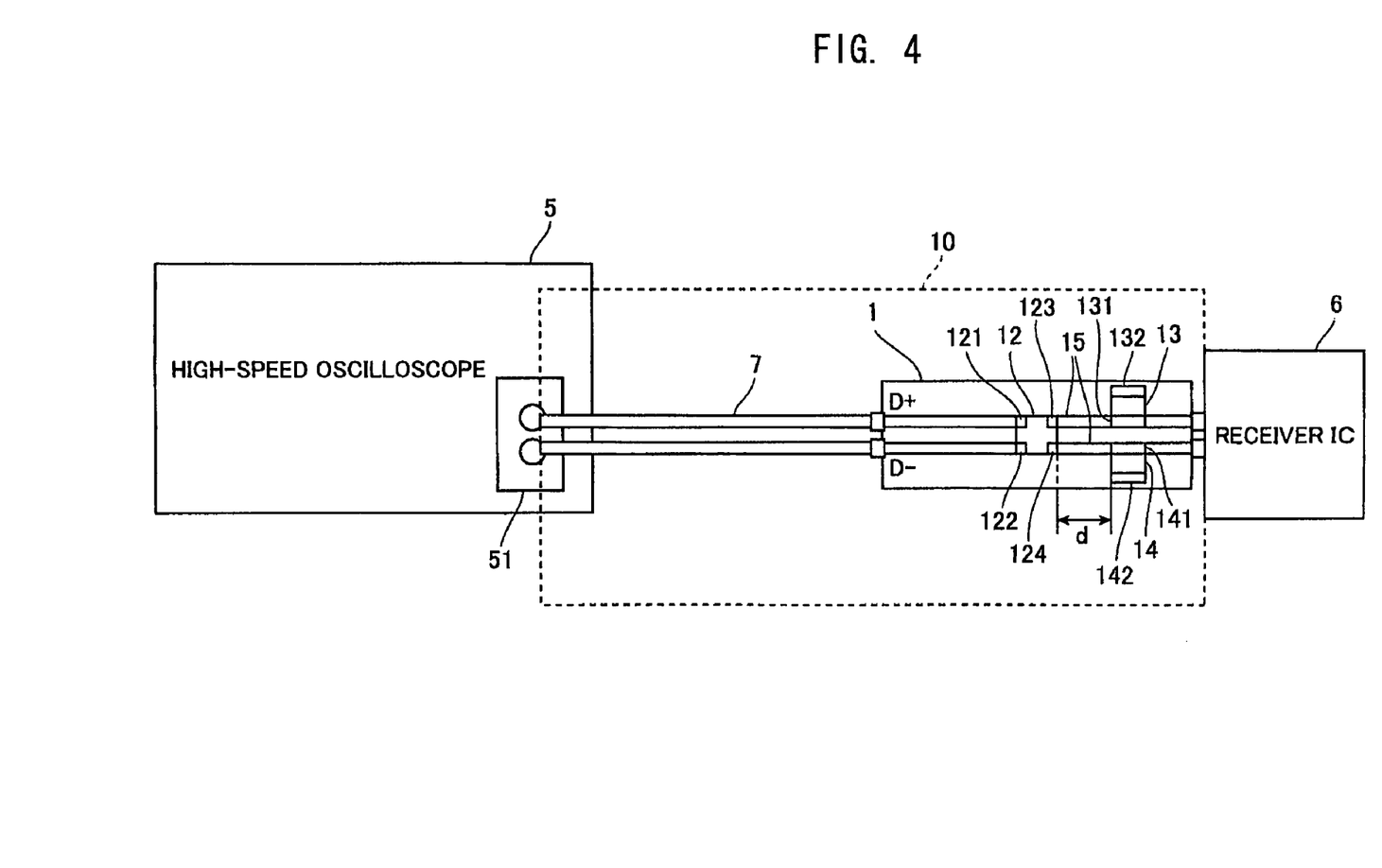
FIG. 4 is an explanatory diagram showing the experimental configuration for measuring characteristic impedance with the TDR method according to the preferred embodiment.

FIG. 4 shows the configuration for measuring characteristic impedance of a transmission path 10 using the TDR method. A high-speed oscilloscope 5 is connected to a receiver IC 6 via the transmission path 10. The oscilloscope 5 has a TDR module 51. The transmission path 10 includes a coaxial cable 7 and the signal transmission circuit 1. The oscilloscope 5 is connected to one end of the coaxial cable 7 by the TDR module 51. The opposite end of the coaxial cable 7 is connected to one end of the signal transmission circuit 1. The opposite end of the signal transmission circuit 1 is connected to the receiver IC 6.

In the preferred embodiment, an Agilent 86100 oscilloscope was used as the oscilloscope 5, and a TDR module 54754 was used as the TDR module 51. The receiver IC 6 has an infinitely large input impedance when the power is off, reflecting 100% of the signal received from the oscilloscope 5. The coaxial cable 7 is configured of two differential signal lines, each having a characteristic impedance of 50 Ω. Therefore, the overall characteristic impedance of the coaxial cable 7 is 100 Ω.

Figure 5A:
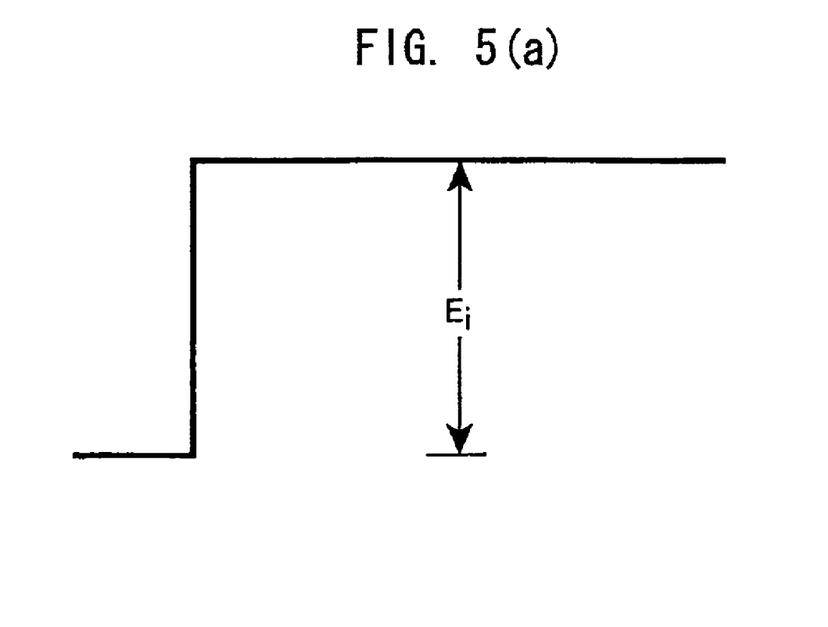
FIG. 5(a) is an explanatory diagram showing a display on an oscilloscope when there are no discontinuous points on the transmission path.

Next, the method of measuring characteristic impedance with the TDR method according to the preferred embodiment will be described with reference to FIGS. 4 and 5. First, the high-speed oscilloscope 5 generates a step voltage Ei and outputs the step voltage Ei to the transmission path 10. While there are no discontinuous points of characteristic impedance on the transmission path 10, the receiver IC 6 reflects the step voltage Ei without change. Therefore, only the step voltage Ei is displayed on the high-speed oscilloscope 5, as shown in FIG. 5(a).

Figure 5B:
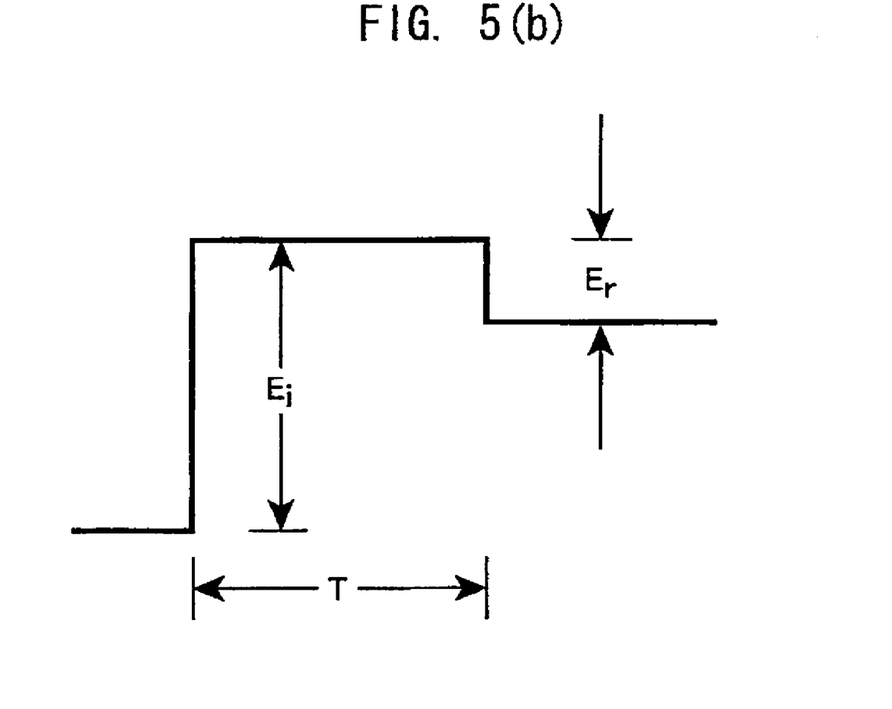
FIG. 5(b) is an explanatory diagram showing a display on an oscilloscope when there are discontinuous points on the transmission path.

However, if a discontinuous point in the characteristic impedance exists on the transmission path 10, part of the step voltage Ei is reflected at this discontinuous point. In this case, a wave algebraically added a reflection wave Er to the step voltage Ei is displayed on the high-speed oscilloscope 5, as shown in FIG. 5(b). Note that the reflection wave Er is minus in FIG. 5(b). From this display, it is possible to find the position of a discontinuous point in the characteristic impedance and the value of the characteristic impedance. Specifically, the position of the discontinuous point in the characteristic impedance can be found from a time T before the reflection wave Er was added, and the value of the characteristic impedance at this position can be found according to the value of the reflection wave Er.

Figure 6A:
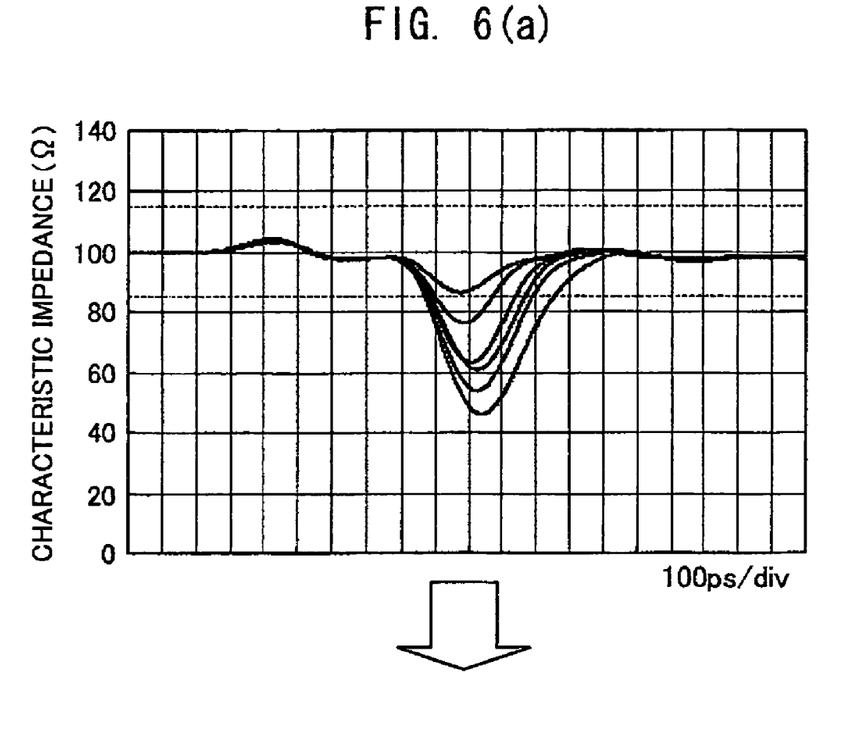
FIG. 6(a) is a graph showing characteristic impedance when the signal transmission circuit is not provided with a common mode filter.
Figure 6B:
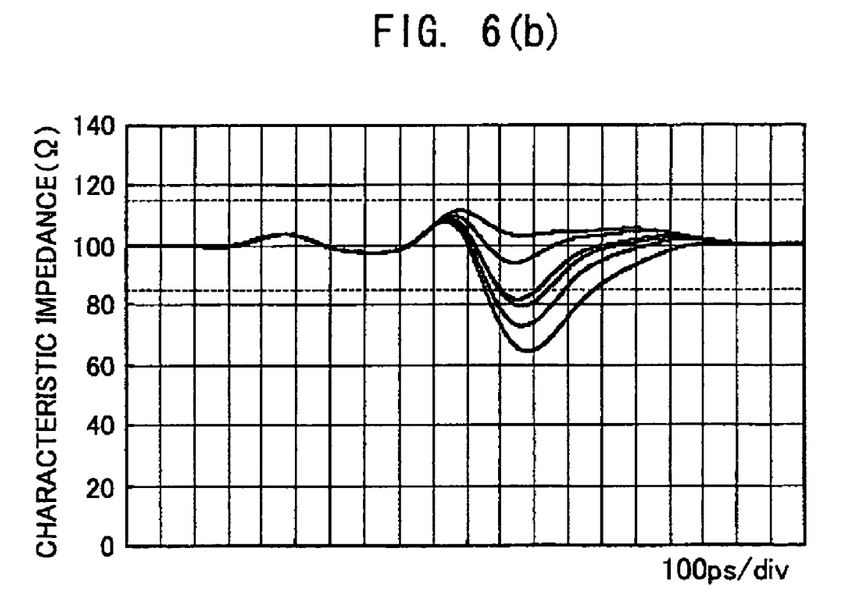
FIG. 6(b) is a graph showing characteristic impedance when the signal transmission circuit is provided with a common mode filter.

FIG. 6(a) is a graph showing the characteristic impedance measured according to the method described above for a transmission path not provided with the common mode filter 12. FIG. 6(b) is a graph showing the characteristic impedance of the transmission path 10 equipped with the common mode filter 12. In this example, an ACM 2012D-900 filter manufactured by TDK Corporation was used as the common mode filter 12, and varistors having five different capacitances were used for the varistors 13 and 14. By comparing the results in FIG. 6(b) to those in FIG. 6(a), it can be seen that use of the common mode filter 12 reduces the drop in characteristic impedance when using the varistors 13 and 14 of any capacitance.

Figure 7:
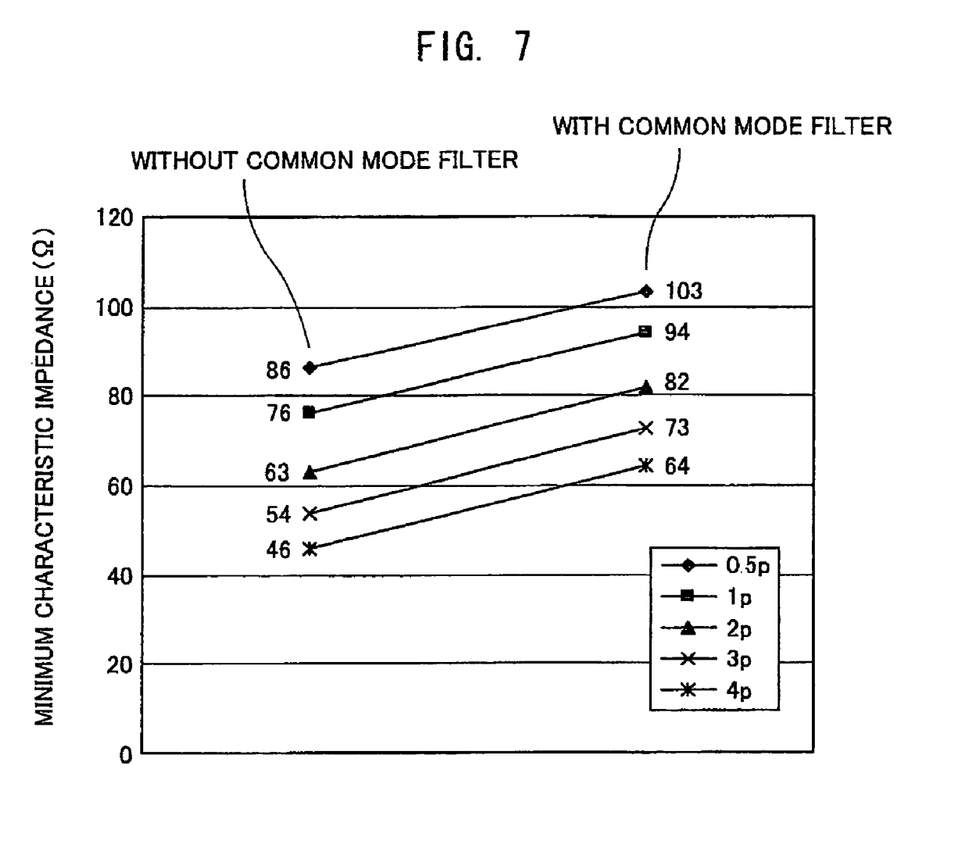
FIG. 7 is a graph showing changes in characteristic impedance on a transmission path.

The graph in FIG. 7 shows the change in the minimum value of characteristic impedance at the varistors 13 and 14 for cases in which the common mode filter 12 was provided and not provided. The minimum characteristic impedance increases about 20 Ω regardless the capacitance of the varistors 13 and 14 when using the common mode filter 12.

The characteristic impedance is improved to some extent by providing the signal transmission circuit 1 with the common mode filter 12 as described above. However, it is preferable that the characteristic impedance would be constant at any point on the transmission as much as possible for providing higher quality images and the like. Therefore, in this embodiment, the distance between the common mode filter 12 and the varistors 13 and 14, that is, a length d of the connectors 15 is set no greater than 3 mm. Here, the length d is a length between an output 123 of the common mode filter 12 and an input terminal 131 of the varistor 13, and between an output 124 of the common mode filter 12 and an input terminal 141 of the varistor 14.

Figure 8A:
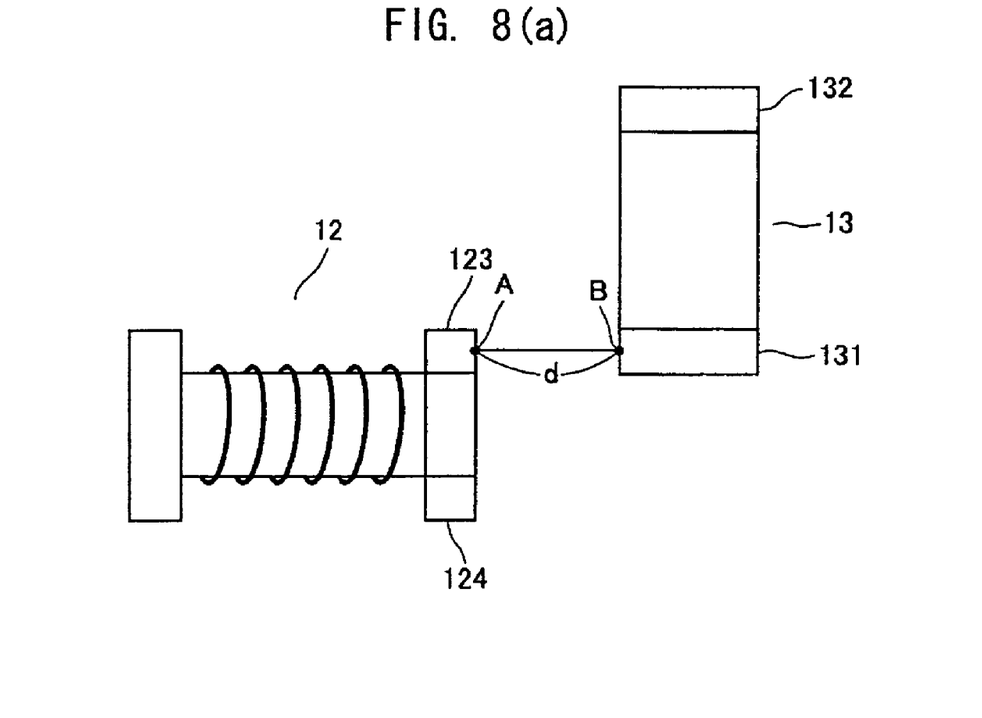
FIG. 8(a) is a plan view showing a chip-type common mode filter and a varistor mounted on a printed circuit board.
Figure 8B:
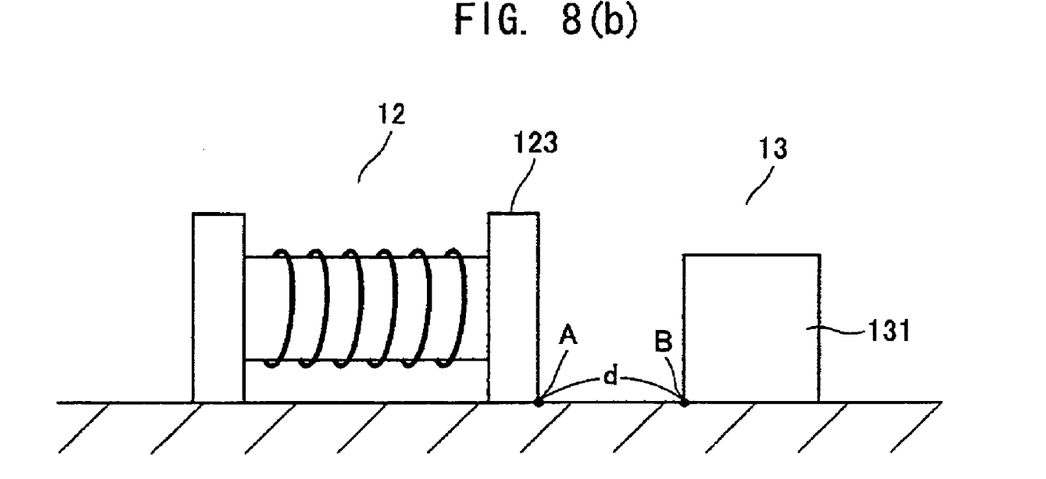
FIG. 8(b) is a side view showing a chip-type common mode filter and a varistor mounted on a printed circuit board.
Figure 9A:
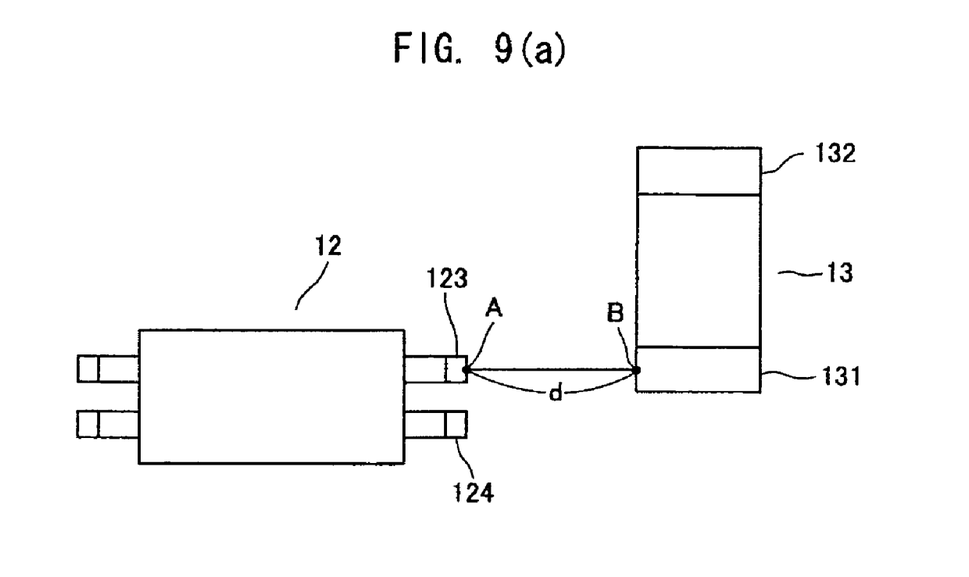
FIG. 9(a) is a plan view showing a lead-type common mode filter and a varistor mounted on a printed circuit board.
Figure 9B:
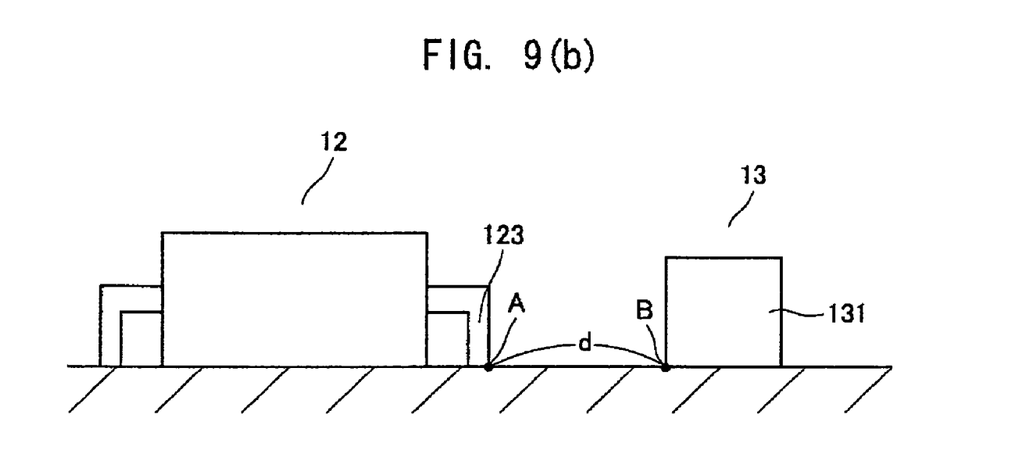
FIG. 9(b) is a side view showing a lead-type common mode filter and a varistor mounted on a printed circuit board.

FIGS. 8(a) and 8(b) show the length d when a chip-type common mode filter 12 and the varistor 13 are disposed on a printed circuit board. FIGS. 9(a) and 9(b) show the length d when a lead-type common mode filter 12 and the varistor 13 are disposed on a printed circuit board. As shown in FIGS. 8(a), 8(b), 9(a), and 9(b), the electrical length between the output 123 of the common mode filter 12 and the input terminal 131 of the varistor 13 denotes the length d in the pattern connecting an edge A of the output 123 to an edge B of the input terminal 131 when the common mode filter 12, and varistors 13 and 14 are disposed on the printed circuit board.

Note that the length d is denoted by the electric length between the output 124 of the common mode filter 12 and the input terminal 141 of the varistor 14 as the same way, while described using the output 123 and the input terminal 131 in this embodiment. Further, the length d includes a length of a curved line though described as a straight line in FIGS. 8(a), 8(b), 9(a), and 9(b). Such a case, the length d means the total length of the curved line.

Figure 10:
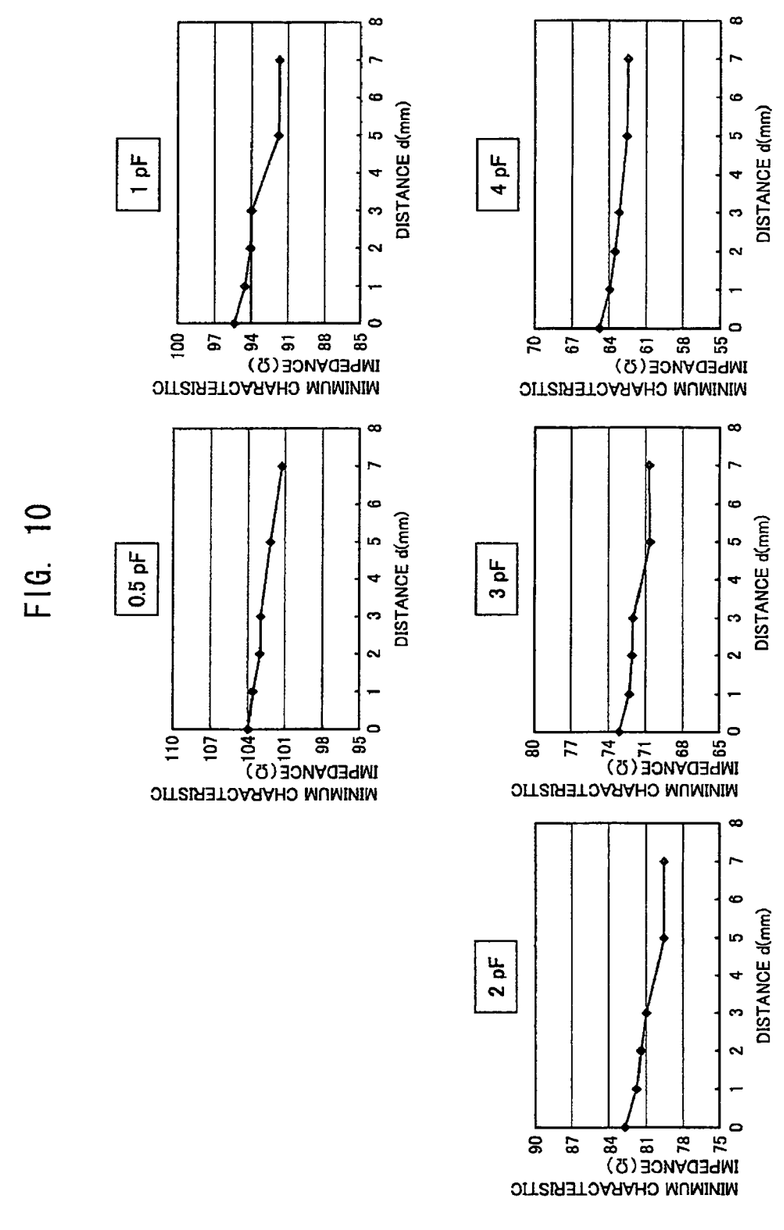
FIG. 10 includes graphs showing the relationship of a length d and minimum characteristic impedance.

FIG. 10 shows graphs illustrating the relationship between the length d and the minimum characteristic impedance measured in experiments using the TDR method. The minimum characteristics impedance becomes high as the length d is shortened, regardless the capacitance of the varistors 13 and 14. Of particular note, the minimum characteristic impedance decreases greatly when the length d exceeds 3 mm. In other words, a large drop in the minimum characteristic impedance can be suppressed by maintaining the length d within 3 mm.

Thus, it is possible to avoid a large drop in the minimum characteristic impedance by setting the length d within 3 mm, reducing reflection caused by unmatched characteristic impedance. This effect can be obtained even if the lengths d for the signal lines 22 and 23 are not equal, provided that each is within 3 mm. At the same time, the inherent effect of the common mode filter in suppressing common mode noise can be maintained.

Standards for noise in using high-speed differential interfaces require the characteristic impedance to be 100±15 Ω. In some cases, the characteristic impedance cannot be maintained in conformance with the standard rating, since common mode filter and varistor are normally determined on such a value that device operates efficiently. In such cases, the characteristic impedance can still be brought within the standard rating by setting the length d within 3 mm.

The characteristic impedance can be improved by setting the length d as short as possible. However, there may be cases in which the common mode filter 12 cannot be placed adjacent to the varistors 13 and 14 due to restrictions in the circuit board pattern. In such a case, inconsistency in the characteristic impedance can be reduced by setting the length d at least within 3 mm.

Figure 11:
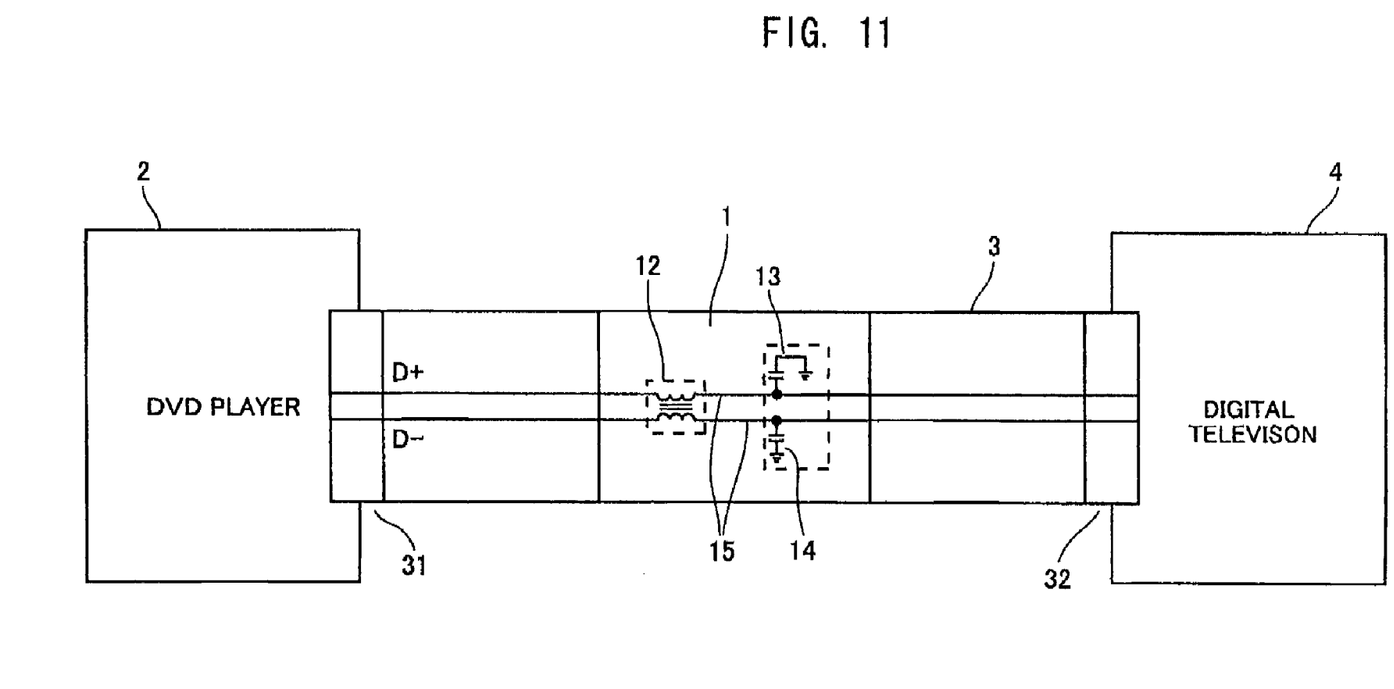
FIG. 11 is an explanatory diagram showing the signal transmission circuit provided in an HDMI cable.

Next, a signal transmission circuit according to a second embodiment of the present invention will be described with reference to FIG. 11. FIG. 11 shows an example in which the signal transmission circuit 1 is provided in the HDMI cable 3. In this example, the signal transmission circuit 1 may be provided in the cable itself or in the connector. The signal transmission circuit of the second embodiment obtains the same effects as that in the first embodiment described above.

Figure 12:
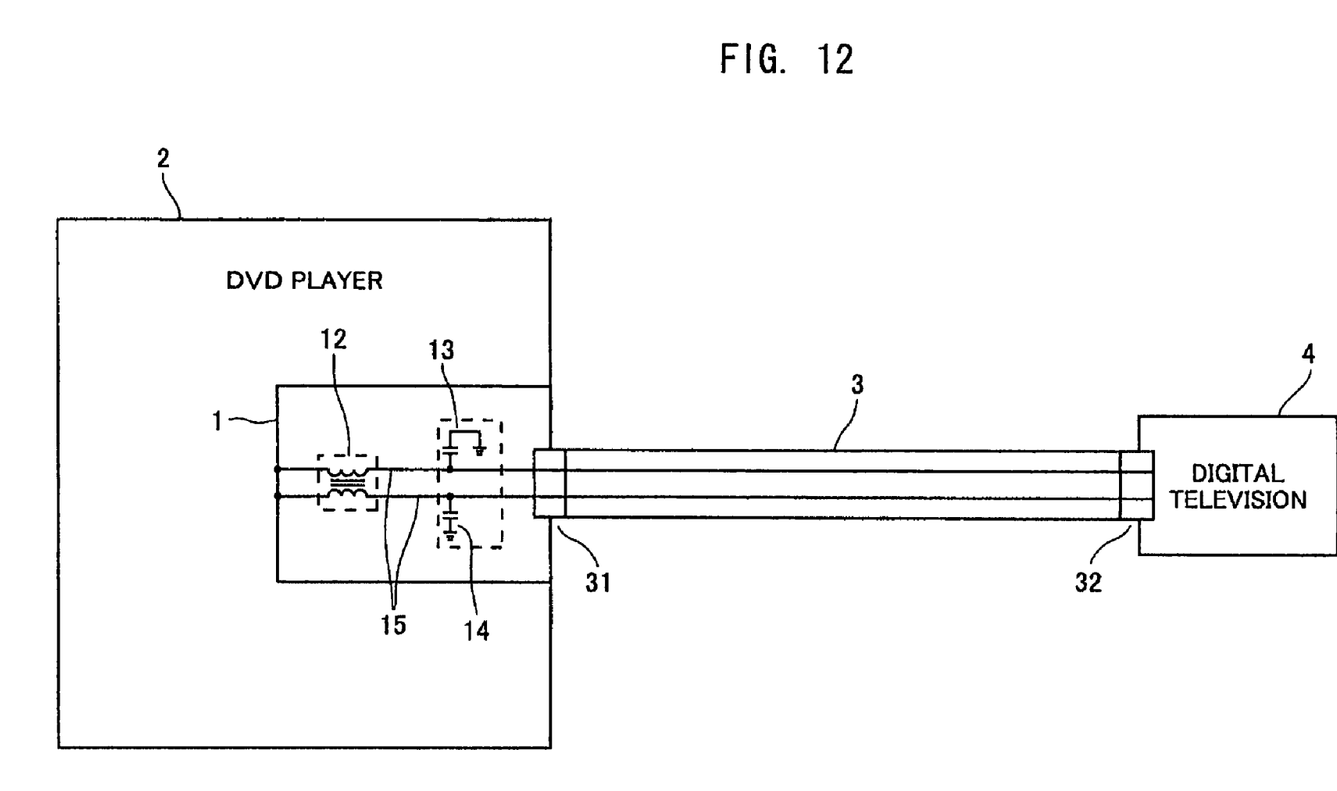
FIG. 12 is an explanatory diagram showing the signal transmission circuit provided in a DVD player.

Next, a signal transmission circuit according to a third embodiment of the present invention will be described with reference to FIG. 12. FIG. 12 shows an example in which the signal transmission circuit 1 is provided in the DVD player 2. In this example, the signal transmission circuit 1 may be provided in the output section of the DVD player 2. The signal transmission circuit of the third embodiment can achieve the same effects as that of the first embodiment described above.

While the invention has been described in detail with reference to specific embodiments thereof, it would be apparent to those skilled in the art that many modifications and variations may be made therein without departing from the spirit of the invention, the scope of which is defined by the attached claims.

For example, the position of the signal transmission circuit 1 is not limited to the position described above. The signal transmission circuit 1 may be disposed at any position after the output of the DVD player 2 and before a first circuit in the digital television 4. Further, a personal computer, set top box, or other digital transmitting device may be substituted for the DVD player 2. A cable employing a different system such as DVI, USB, or IEEE may be substituted for the HDMI cable 3. An LCD monitor or other digital video device may be substituted for the digital television 4. Also, a capacitor, tuner diode, or other capacitive element may be used in place of the varistor 13.

What is claimed is:

1. A signal transmission circuit having a characteristic impedance and comprising:
   a common mode filter including a core, and first and second signal lines wound in a spiral around the core, the first signal line having a first input and a first output, the second signal line having a second input and a second output, wherein signals in reverse phase are input to the first input and the second input;
   a first capacitive element having a first terminal;
   a first connection line having a first end and a second end, the first connection line being connected to the first output only at the first end, the first connection line being connected to the first terminal only at the second end, wherein the first connection line has a first length;
   a second capacitive element having a second terminal; and
   a second connection line having a primary end and a secondary end, the second connection line being connected to the second output only at the primary end, the second connection line being connected to the second terminal only at the secondary end, wherein the second connection line has a second length,
   wherein each of the first length and the second length is within 3 mm to change the characteristic impedance.

2. The signal transmission circuit according to claim 1, wherein each of the first connection line and the second connection line is a pattern formed on a printed circuit board.

3. The signal transmission circuit according to claim 1, wherein each of the first capacitive element and the second capacitive element is a varistor.

4. An electronic device comprising a signal transmission circuit, wherein the signal transmission circuit having a characteristic impedance and comprising:
   a common mode filter including a core, and first and second signal lines wound in a spiral around the core, the first signal line having a first input and a first output, the second signal line having a second input and a second output, wherein signals in reverse phase are input to the first input and the second input;
   a first capacitive element having a first terminal;
   a first connection line having a first end and a second end, the first connection line being connected to the first output only at the first end, the first connection line being connected to the first terminal only at the second end, wherein the first connection line has a first length;
   a second capacitive element having a second terminal; and
   a second connection line having a primary end and a secondary end, the second connection line being connected to the second output only at the primary end, the second connection line being connected to the second terminal only at the secondary end, wherein the second connection line has a second length,
   wherein each of the first length and the second length is within 3 mm to change the characteristic impedance.

5. A cable comprising a signal transmission circuit, wherein the signal transmission circuit having a characteristic impedance and comprising:
   a common mode filter including a core, and first and second signal lines wound in a spiral around the core, the first signal line having a first input and a first output, the second signal line having a second input and a second output, wherein signals in reverse phase are input to the first input and the second input;
   a first capacitive element having a first terminal;
   a first connection line having a first end and a second end, the first connection line being connected to the first output only at the first end, the first connection line being connected to the first terminal only at the second end, wherein the first connection line has a first length;
   a second capacitive element having a second terminal; and
   a second connection line having a primary end and a secondary end, the second connection line being connected to the second output only at the primary end, the second connection line being connected to the second terminal only at the secondary end, wherein the second connection line has a second length,
   wherein each of the first length and the second length is within 3 mm to change the characteristic impedance.

* * * * *